United States Patent
Foong et al.

(10) Patent No.: US 7,422,628 B2
(45) Date of Patent: Sep. 9, 2008

(54) VOLATILE HYDROCARBON ADSORBER UNIT

(75) Inventors: John S. Foong, Piscataway, NJ (US); Jeffrey B. Hoke, North Brunswick, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 370 days.

(21) Appl. No.: 10/830,351

(22) Filed: Apr. 22, 2004

(65) Prior Publication Data

US 2004/0226440 A1 Nov. 18, 2004

Related U.S. Application Data

(63) Continuation-in-part of application No. 10/435,860, filed on May 12, 2003, now abandoned.

(51) Int. Cl.
*B01D 53/02* (2006.01)

(52) U.S. Cl. .............. 96/108; 96/135; 96/154; 55/385.3; 123/198 E; 123/519

(58) Field of Classification Search ............ 96/108, 96/154, 135; 502/407, 408, 415, 416; 55/385.3; 123/198 E
See application file for complete search history.

(56) References Cited

U.S. PATENT DOCUMENTS

| | | | |
|---|---|---|---|
| 3,730,158 A | 5/1973 | St. Amand | |
| 3,838,673 A | 10/1974 | Csicsery | |
| 4,308,841 A | 1/1982 | Kingsley | 123/520 |
| 4,418,662 A | 12/1983 | Engler et al. | |
| 4,711,009 A | 12/1987 | Cornelison et al. | |
| 4,750,465 A | 6/1988 | Rediker, Jr. et al. | 123/519 |
| 4,870,046 A | 9/1989 | Yamanaka et al. | 502/439 |
| 4,877,001 A | 10/1989 | Kenealy et al. | 123/519 |
| 4,985,210 A | 1/1991 | Minami | 422/169 |
| 5,051,244 A | 9/1991 | Dunne et al. | 423/212 |
| 5,125,231 A | 6/1992 | Patil et al. | 60/274 |
| 5,158,753 A | 10/1992 | Take et al. | 422/173 |
| 5,492,883 A | 2/1996 | Wu et al. | |
| 5,587,137 A * | 12/1996 | Swaroop et al. | 423/239.2 |
| 5,714,683 A | 2/1998 | Maloney | |
| 5,912,368 A | 6/1999 | Satarino et al. | 55/320 |
| 6,000,217 A | 12/1999 | Hochmuth | 60/274 |
| 6,004,896 A * | 12/1999 | Addiego | 502/64 |
| 6,074,973 A | 6/2000 | Lampert et al. | |
| 6,089,014 A | 7/2000 | Day et al. | 60/274 |
| 6,171,556 B1 | 1/2001 | Burk et al. | 422/173 |
| 6,432,179 B1 | 8/2002 | Lobovsky et al. | 96/296 |
| 6,438,486 B1 | 8/2002 | Mancini | 701/104 |
| 6,464,761 B1 | 10/2002 | Bugli | 96/135 |
| 6,497,848 B1 | 12/2002 | Deeba et al. | |
| 6,692,555 B2 | 2/2004 | Oda et al. | |
| 6,736,871 B1 | 5/2004 | Green et al. | |
| 6,752,859 B2 * | 6/2004 | LaBarge et al. | 96/134 |
| 6,817,345 B2 | 11/2004 | Lawrence | |
| 2002/0043156 A1 | 4/2002 | Shea | 96/134 |
| 2003/0082824 A1 | 5/2003 | Dumas et al. | 436/139 |
| 2003/0145732 A1 | 8/2003 | Leffel et al. | 96/134 |
| 2003/0192512 A1 | 10/2003 | Luley et al. | 123/519 |
| 2004/0050252 A1 | 3/2004 | Wernholm et al. | 95/143 |
| 2004/0069146 A1 | 4/2004 | Carter et al. | 96/108 |
| 2004/0213708 A1 * | 10/2004 | Wagner et al. | 422/180 |

FOREIGN PATENT DOCUMENTS

| | | |
|---|---|---|
| CN | 1059701 A | 3/1992 |
| DE | 101 02 604 A 1 | 7/2002 |
| EP | 716877 A1 * | 6/1996 |
| EP | 1 110 593 A1 | 6/2001 |
| EP | 1 273 789 A1 | 1/2003 |
| EP | 1 321 659 A2 | 6/2003 |
| EP | 1 331 118 A1 | 7/2003 |
| WO | WO96/22146 | 7/1996 |
| WO | WO97/11769 | 4/1997 |
| WO | WO2004/033889 A1 | 4/2004 |

OTHER PUBLICATIONS

"Innovations: Air Induction System with Emissions Control", May 1, 2003; Internet: Http://www.visteon.com/about/features/2003/050103.shtml.

"Cold-Start Hydrocarbon Collection for Advanced Exhaust Emission Control", SAE Technical Paper Series No. 920487, Feb. 24-28, 1992.

\* cited by examiner

*Primary Examiner*—Robert A Hopkins
(74) *Attorney, Agent, or Firm*—Melanie Brown; Scott S. Servilla; Diehl Servilla LLC

(57) ABSTRACT

A hydrocarbon adsorption unit for recovery of volatile hydrocarbons which emanate from several sources and which would otherwise be released into the atmosphere through the air cleaner of an automobile engine when the engine is shut-off. The unit is positioned in the air intake system such that all air flowing through the engine passes through the unit. The unit comprises a housing having an air inlet and an air outlet. The housing contains a substrate and a volatile hydrocarbon adsorber material coated on the surface of the substrate. The adsorber material may be silica gel, a molecular sieve and/or activated carbon. The material further contains a binder that will cause the material to adhere to the surface of the substrate.

19 Claims, No Drawings

VOLATILE HYDROCARBON ADSORBER UNIT

CROSS-REFERENCE TO RELATED APPLICATION

This application is a continuation-in-part of application Ser. No. 10/435,860 filed May 12, 2003 now abandoned.

FIELD OF THE INVENTION

This invention relates to a unit for adsorbing volatile hydrocarbon fuel vapors in the air induction system of an automobile. These vapors are generated after engine shut-off and, if not adsorbed, will flow out of the air cleaner into the atmosphere.

RELATED ART

Systems and methods for trapping volatile hydrocarbon fuel vapors, from the fuel tank of an automobile are well known. Such systems are typically referred to as evaporative loss control systems and rely on a canister containing a regenerable adsorbent such as activated charcoal. The adsorbent adsorbs the volatile hydrocarbons and when engine operating conditions are appropriate for combusting the trapped hydrocarbons, a stream of air is passed through the adsorbent to desorb the adsorbent and the hydrocarbon-laden air stream is passed into the engine where the desorbed hydrocarbons are combusted. Exemplary U.S. patents disclosing evaporative loss control systems include the following: U.S. Pat. Nos. 4,877,001; 4,750,465; and 4,308,841.

Systems and methods for adsorbing uncombusted hydrocarbons in the exhaust gas stream of an automobile are also well known. These systems and methods are particularly useful for adsorbing uncombusted hydrocarbons emitted during the cold start of the automobile engine.

For example, U.S. Pat. No. 4,985,210 is directed to an exhaust gas purifying apparatus for an automobile employing a three-way catalyst with either a Y-type zeolite or a mordenite used in a hydrocarbon trap upstream of the three-way catalyst. In the embodiment of FIG. 2 of U.S. Pat. No. 4,985,210, a bed of activated carbon is disposed upstream of an adsorbent zone. A solenoid-operated valve mechanism serves to direct the exhaust gas stream either through or around the activated carbon bed, depending on the temperature of the exhaust gas stream, and then through the adsorbent zone and the three-way catalyst.

U.S. Pat. No. 5,051,244 is directed to a process for treating an engine exhaust gas stream in which the gas stream is directed through a molecular sieve in an adsorbent zone during the cold-start phase of engine operation. When the hydrocarbons begin to desorb, the adsorbent zone is by-passed until the catalyst is at its operating temperature, at which point the gas stream is again flowed through the adsorbent zone to desorb hydrocarbons and carry them to the catalyst zone. A paper by M. Heimrich, L. Smith and J. Kotowski entitled *Cold-Start Hydrocarbon Collection for Advanced Exhaust Emission Control*, SAE Publication Number 920847, discloses an apparatus which functions in a manner similar to that of U.S. Pat. No. 5,051,244.

U.S. Pat. No. 5,125,231 discloses an engine exhaust system for reducing hydrocarbon emissions, including the use of beta zeolites as hydrocarbon adsorbents. Zeolites having a silica/alumina ratio in the range of 70/1 to 200/1 are preferred adsorbents. The apparatus includes by-pass lines and valves to direct exhaust gases from a first converter directly to a second converter during cold-start operation and when the first converter reaches its light-off temperature, to either by-pass the second converter or recycle effluent from it to the first converter.

U.S. Pat. No. 5,158,753 discloses an exhaust gas purifying device comprising: a catalyst device installed in the exhaust gas path of an internal combustion engine for treating the exhaust gas of the engine; an adsorbing device installed in the exhaust gas path between the catalyst device and the internal combustion engine, for treating the exhaust gas of the engine. One embodiment includes a heat exchanger for performing heat transfer between the exhaust gas flowing from the internal combustion engine to the adsorbing device and the exhaust gas flowing from the adsorbing device to the catalyst device. Alternatively, the catalyst device includes a catalyst secured in the low-temperature-side gas flow path of a heat exchanger, and the exhaust gas flowing from the internal combustion engine to the adsorbing device is allowed to flow to the high-temperature-side gas flow path of the heat exchanger.

U.S. Pat. No. 6,171,556 discloses a method and apparatus for treating an exhaust gas stream containing hydrocarbons and other pollutants. The method comprises the steps of flowing the exhaust gas stream through a catalytic member comprising a monolith body having a first catalyst zone and a second catalyst zone therein to contact a catalyst in a first catalyst zone to convert at least some of the pollutants in the exhaust gas stream into innocuous products. The exhaust gas stream is then discharged from the catalytic member and flowed through an adsorbent zone to adsorb at least some of the hydrocarbon pollutants with an adsorbent composition. The exhaust gas stream is discharged from the adsorbent zone and flowed to the second catalyst zone to convert at least some of the pollutants into innocuous products. The exhaust gas stream, so treated, is then discharged to the atmosphere through suitable discharge means. A preferred adsorbent is a zeolite, having a relatively high silica to alumina ratio and a low relative Bronsted acidity. The preferred adsorbent compositions comprise beta zeolites.

Systems for adsorbing vapors which would other wise be emitted into the atmosphere from the vehicle's air induction system when the vehicle is shut-off are also well known. U.S. patent application Publication Ser. No. US2002/0043156 A1 discloses a housing securing an air filter having an air stream inlet and an air stream outlet. The air filter comprises a filter media disposed on a support that is disposed within, or secured to, the housing and an air permeable hydrocarbon adsorbing material is disposed between the filter media and the support at the air stream outlet end of the filter. The preferred hydrocarbon adsorbent is an activated carbon cloth.

EP 1 110 593 A1 is similar to the U.S. Patent Application Publication. The EP Patent Application discloses an air filter assembly including a housing and a plurality of filter layers disposed in the housing. One of the filter layers is a carbon impregnated polyurethane foam layer to remove hydrocarbon vapors diffusing through an air inlet to the filter when the engine is shut-off.

OBJECT OF THE INVENTION

It has been found that a significant amount of volatile hydrocarbons from several sources collect in the air induction system of the automobile engine after the engine has been shut off. These hydrocarbons are then discharged into the atmosphere after the engine has been shut off. Prior art systems and methods devote relatively little attention to prevention of the emissions of such hydrocarbons through the air induction system of the engine since the amounts of such emissions are relatively small as compared to the emissions of hydrocarbons from the fuel system and the exhaust gas stream which would pass into the atmosphere if left untreated. Nevertheless, in view of the increasingly stringent federal and state regulations mandating the elimination of all emissions of uncombusted hydrocarbons in the atmosphere to the extent technically feasible, it is desirable to provide equipment to adsorb such hydrocarbons.

Accordingly, it is the object of this invention to provide a unit for adsorbing volatile hydrocarbons emitted after the engine has been shut-off, in the air induction system upstream of the engine and thereby prevent the emission of such hydrocarbons into the atmosphere.

SUMMARY OF THE INVENTION

The invention comprises a unit for adsorbing hydrocarbons emitted into the air induction system of a vehicular engine during engine shut-off. The hydrocarbon adsorbent material within the unit comprises silica gel, a molecular sieve and/or activated carbon.

DETAILED DESCRIPTION OF THE INVENTION

The unit of this invention is particularly suited for adsorbing volatile hydrocarbon fuel vapors that would otherwise be emitted into the atmosphere through the air induction system of an automobile engine after the engine has been shut off. Such fuel vapors emanate from several sources, e.g., residual fuel, puddle, post-run injector, leakage, blowby, hydrocarbons from exhaust gas recycle, oil hydrocarbons from the PCV, etc. It is the goal of this invention to adsorb such fuel vapors to the extent that no more than 0.01 g/day of such fuel vapors are emitted, thereby helping to meet the LEV II and PZEV limits which will be imposed by the California Air Resource Board and the Tier II limits which will be imposed by the Federal government in respect to the 2004 model year automobiles.

The volatile hydrocarbon adsorber unit for controlling the emission of volatile hydrocarbons from the air intake system of an engine is positioned in the air intake system such that all air flowing through the engine passes through the unit. The unit comprises a housing having an air inlet and an air outlet. The housing contains a substrate and a volatile hydrocarbon adsorber material coated on the surface of the substrate. The material contains a binder that will cause the material to adhere to the surface of the substrate.

Desorption of the volatile hydrocarbons adsorbed by the material occurs by passing a clean air stream through the unit and combusting the desorbed hydrocarbons when the engine is in an operating mode, i.e., when the vehicle is in motion and/or is in an idling mode. The adsorption of the volatile hydrocarbons in the unit of the invention will occur at relatively low temperatures, e.g., about 0 to about 350° F. (higher temperatures tend to favor desorption rather than adsorption).

The housing for the volatile hydrocarbon adsorbent material may be comprised of a variety of metals or polymers. The selected metal or polymer should, of course, be resistant to the temperatures existing in the air induction system during various engine operating conditions, especially prolonged idling, and preferably have light weight. Of course, the housing must be resistant to oils, fuels, greases, etc. which are commonly employed for engine operation. The dimensions of the housing is not critical but is dictated by the dimensions of the conduit leading from the air cleaner to the air intake manifold of the engine, since the housing should tightly fit within such conduit (typical oil- and hydrocarbon-resistant gaskets may be employed at the end(s) of the housing to insure a vapor tight seal between the outside of the body and the inner wall of the conduit).

The housing will have an air inlet and an air outlet and will typically be open at both its ends. The shape of the housing is not critical, i.e., it may be in the shape of a cylinder, triangle, square, rectangle, polygon, etc. The length of the housing is not critical, but typically it will have a length of about 1 to about 5 inches, a width or diameter of about 1 to about 5 inches and a wall thickness of about 0.5 to about 2 mm.

Suitable materials for construction of the housing include thermoplastic polymers, thermoset polymers and metals, especially aluminum, a Fe—Cr alloy or a Cr—Al—Fe alloy which are resistant to the temperatures and materials present within the engine compartment (e.g., liquid fuels, fuel vapors, oils, greases, etc.).

The adsorption material used for the process of the present invention comprises a hydrocarbon adsorbent, preferably disposed on a substrate. The hydrocarbon adsorbent preferably is hydrophobic as well as organophilic (i.e., highly adsorptive for organic chemicals). Preferably, the substrate comprises a polymer or a metal such as aluminum, titanium, stainless steel, a Fe—Cr alloy or a Cr—Al—Fe alloy in the form of a sheet, mesh, foil, etc. In order to increase the surface area of the adsorbent, it is desirable that the metal substrate be present in a corrugated mode. Typically, the hydrocarbon adsorbent will be disposed on the substrate in a loading of about 0.2 to about 3 $g/in^3$, e.g., 1.25 $g/in^3$.

The hydrocarbon adsorbent may be silica gel, a molecular sieve, activated carbon or mixtures thereof. The material may be disposed within the housing as a single layer or separate layers of silica gel, a molecular sieve or activated carbon. Preferably the material comprises a molecular sieve alone or in admixture with about 5 to about 50 wt. % of an activated carbon having a pore size of about 5 to about 500 angstroms.

Preferably, the molecular sieve will be a natural or synthetic zeolite such as faujasite, chabazite, clinoptilolite, mordenite, silicalite, zeolite X, zeolite Y, ultrastable zeolite Y, ZSM zeolite, offretite, or a beta zeolite.

Typically, the substrate is initially coated with a slurry of a high surface area refractory metal oxide, dried for about 0.5 to about 2 hours at about 90 to about 120° C. and thereafter calcined at about 450 to about 650° C. for 0.5 to about 2 hours. High surface area refractory metal oxides are well known in the prior art. Typically, the refractory metal oxide will have a specific surface area of about 60 to about 300 $m^2/g$. Useful refractory metal oxides include alumina, titania, zirconia and mixtures of alumina with one or more of titania, zirconia, ceria, baria and a silicate. Preferably, the refractory metal oxide comprises gamma-alumina.

Thereafter, the refractory metal oxide-coated substrate is coated with a slurry of the desired adsorbent and dried (e.g., at about 105° C.). Alternatively, the refractory metal oxide-coated substrate may be coated with separate slurries of the silica gel, molecular sieve and/or activated carbon to create layers, with drying between each layer occurring as described above.

If desired, a further top coat layer of the high surface area refractory metal oxide may be applied on top of the adsorbent, thereafter drying as described above after the application of each layer.

It should also be noted that each layer need not extend to the entire layer of the substrate. For example, the entire length of the substrate may be coated with gamma alumina, dried and calcined. The entire length of the alumina-coated substrate is then coated with the selected zeolite plus binder and dried.

Thereafter, only a portion of the zeolite plus binder layer may be coated with a layer of activated carbon followed by drying. Alternatively, a front section of the alumina-coated substrate is coated with the selected zeolite plus binder and a rear section is concurrently coated with activated carbon plus binder, followed by drying. As a further alternate, the alumina-coated substrate containing a middle layer of the selected zeolite may then be coated with a mixture of gamma-alumina and activated carbon (20-80 wt. % alumina and the balance being activated carbon), followed by drying.

A preferred adsorbent material is a zeolite having a high silica to alumina ratio. The particularly preferred adsorbent comprises a beta zeolite of the type disclosed in U.S. Pat. No. 6,171,556 incorporated herein by reference in its entirety.

Generally, sieve materials having so-called three-dimensional pore configurations are preferred over sieve materials having one- or two-dimensional pore configurations, although some of the latter function acceptably well. Acceptable materials typically have a micropore diameter of from about 3 to 8 angstroms. Unexpectedly, zeolites (especially beta zeolites) having silica/alumina ratio ranges of about 25/1 to 300/1, and preferably from about 100/1 to about 250/1, have been shown to be particularly effective adsorbents. The preferred beta zeolites are ion-exchanged beta zeolites, such as H/beta zeolite and Fe/beta zeolite.

Preferred zeolites include ZSM-5, Y and beta zeolites, with beta zeolites particularly preferred. The preferred zeolites can be treated to reduce the number of acid sites. This can be accomplished by leaching the zeolite with an organic or inorganic acid. Preferred acids include strong inorganic acids, such as sulfuric acid, nitric acid, hydrochloric acid, phosphoric acid and the like, and carboxylic acids such as trifluoroacetic acid, and dicarboxylic acids such as oxalic, malonic, succinic, glutaric, adipic, maleic, fumaric, phthalic and the like. Useful acids preferably include polyacids, preferably difunctional acids, more preferably dicarboxylic acids with oxalic acid most preferred. The acid use is at a concentration of 0.02 to 12N, preferably 0.1 to 10N, and a solid zeolite concentration of 0.01 to 1.0 g/ml and preferably 0.05 to 0.5 g/ml. The leaching is conducted at a suitable temperature range, typically of from 10 to 100° C.; for example, preferably at 70 to 100° C. when using sulfiric acid and from 10 to 50° C. when using oxalic acid. The leaching is conducted for a sufficient time to achieve the desired silica to alumina ratio attainable at the leach conditions and concentrations, and is typically from about 0.5 to 5 hours, and preferably 0.5 to 3 hours.

The zeolite may be used as is or it may be treated with steam at about 350 to about 900° C. Preferably, the stream treatment is conducted at 400 to 800° C., and more preferably 500 to 750° C. with a most preferred range being from 550 to 750° C. The steam temperature can be increased at a suitable rate such as from 100 to 600° C. per hour. Typical steam concentration is from 10 to 100% and preferably 30 to 100% with a preferred concentration at from about 50 to 100% with the balance being air. The steaming is preferably conducted at atmospheric pressure. The duration of the steam treatment is sufficient to treat the zeolite and is typically from 0.5 to 48 hours, preferably 0.5 to 24 hours, more preferably from 0.5 to 8 hours and most preferably 0.5 to 5 hours. The steam treatment does not significantly increase the silica to alumina ratio. However, it is believed to reduce the acidity of the zeolite by removing at least some of the aluminum from the framework of the zeolite. Steam treated zeolites have been found to increase the durability of zeolites when used to adsorb hydrocarbons in gaseous streams and to resist coke formation. Preferably, the zeolite is treated with both acid (e.g., sulfuric acid) leaching and steam treatment.

In a particularly preferred process, the zeolite is first acid leached followed by steam treatment. Optionally, the steps of steam treatment and acid leaching may be repeated in any desired order. For example, leached and steamed zeolite may be repeatedly leached followed by steaming. In a specific embodiment, the zeolite may be leached, steamed and leached again.

A useful method to treat beta zeolite is disclosed in CN 1059701A, published Mar. 25, 1992 and incorporated herein by reference. This reference discloses a high Si beta zeolite produced by calcining to remove nitrogen compounds from a beta zeolite made through an organo-amine template process. Leaching the beta zeolite is accomplished with an organic or inorganic acid solution having a concentration of 0.02 to 12N, preferably 0.1 to 10N, and a solid zeolite concentration of 0.01 to 1.0 g/ml and preferably 0.05 to 0.5 g/ml at from 10 to 100° C. for 0.5 to 5 hours, and preferably 1 to 3 hours. The leaching is followed by treating the zeolite with steam at from 400 to 900° C. with the steam temperature increasing at from 100 to 600° C. per hour. Disclosed steam concentration is 100% at a system pressure of 50 to 500 KPa. The duration of the steam treatment is from 0.5 to 5 hours.

In accordance with a preferred embodiment of the present invention, zeolites can be used which are treated to increase the silica to alumina ratio supplemented by steam treatment. Methods to increase the silica to alumina ratio result in removal of the alumina from the zeolite. Leaching for example removes aluminum from the framework of the zeolite structure. The removed aluminum in the form of aluminum ion salt is removed with the leaching liquor.

Of particular interest with regard to the present invention is the acidity which is imparted by the alumina in the zeolite framework. It is believed that the high silica to alumina ratio attained by leaching is related to the acidity of the zeolite. The acidity of the zeolite is believed to affect the durability of the zeolite when used to adsorb hydrocarbons from exhaust streams such as automotive and industrial exhaust steams which are typically at temperatures in the range of from 300 to 800° C. and more typically from 350 to 600° C. The zeolite, when used in such environments tends to lose adsorption efficiency due primarily to clogging of the pores and/or collapse of the zeolite framework. Maintenance of the stable zeolite framework can be attained by controlling the conditions under which the zeolite is treated. Such conditions include acid concentrations, steam temperatures and the like. Milder conditions reduce the tendency for the zeolite framework to deteriorate during treatment and permit the framework to be stabilized at the location where the alumina was removed.

Additionally, it is believed that steam treatment removes aluminum from the zeolite framework. The affected aluminum continues to reside in the zeolite, probably in the pores. The zeolite framework is believed to stabilize without the aluminum and the aluminum ions in the pores becomes alumina. The remaining alumina in the pores is believed not contribute to the acidity of the zeolite which is reduced. The alumina in the pores can remain or be washed or leached out in a subsequent leaching step.

The zeolite, non-steamed or steamed, has been found to have improved coking resistance, i.e., the formation of coke during engine testing has been significantly reduced. While acid leaching methods to increase the silica to alumina ratio of a zeolite are known to decrease acidity, such methods are believed to remove aluminum atoms from zeolite particles indiscriminately. Methods such as steaming remove the aluminum from the framework of the zeolite preferentially at the Bronsted acid sites. The importance of this can be recognized by both more effective resistance to coking and by the knowledge of how to treat a zeolite to attain such performance with minimizing deterioration of the framework. In essence, leaching a zeolite to death will result in reduced Bronsted acidity; but using a method such as steam treatment alone, or more preferably balanced with leaching results in a more durable zeolite for use as a hydrocarbon adsorber in accordance with the present invention.

The volatile hydrocarbon adsorbent material will also include a binder that will cause the material to adhere to the surface of the substrate. Such a binder is also referred to as a washcoat binder. Washcoat binders typical for use in the formulation of slurries include, but are not restricted to, the following: organic polymers; sols of alumina, silica or zirconia; inorganic salts, organic salts and/or hydrolysis products of aluminum, silica or zirconium; hydroxides of aluminum, silica or zirconium; organic silicates that are hydrolyzable to silica; and mixtures thereof.

The preferred binder is an organic polymer used in amounts of from 0.5 to 20, preferably 2 to 10, percent by weight of binder based on the weight of the material. The organic polymer may be a thermosetting or thermoplastic polymer and may be plastic or elastomeric. The polymeric binder may contain suitable stabilizers and age resistors known in the polymeric art. Most preferred are thermosetting, elastomeric polymers introduced as a latex into the adsorbent composition, preferably as an aqueous slurry. Upon application of the composition and drying, the binder material fixes the adsorbent particles to themselves and the substrate, and in some cases, can crosslink with itself to provide improved adhesion. This enhances the integrity of the coating, its adhesion to the substrate and provides structural stability under vibrations encountered in motor vehicles. The use of a binder enables the material to adhere to the substrate without the necessity of an undercoat layer. The binder can comprise additives to improve water resistance and improve adhesion.

Useful organic polymer binder compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics and styrene acrylics, polyvinyl alcohol, thermoplastic polyesters, thermosetting polyesters, poly(phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoro-ethylene copolymer, polyamide, phenolic resins and epoxy resins, polyurethane, and silicone polymers. A most preferred polymeric binder is an acrylic/styrene acrylic copolymer latex.

It is also preferred to use a dispersant in conjunction with the binder. The dispersant may be anionic, non-ionic or cationic and is typically utilized in an amount of about 0.1 to about 10 wt. %, based on the weight of the material. Suitable dispersants include polyacrylates, alkoxylates, carboxylates, phosphate esters, sulfonates, taurates, sulfosuccinates, stearates, laureates, amines, amides, imidazolines and mixtures thereof. A preferred dispersant is a low molecular weight polyacrylic acid in which many of the protons on the acid are replaced with sodium. A preferred composite comprises about 90 wt. % beta zeolite, about 9 wt. % acrylic polymer latex and about 1 wt. % dispersant.

The following nonlimiting examples illustrate the invention. Unless otherwise indicated, all parts and percentages are on a weight basis.

EXAMPLE 1

Sulfuric acid-leached ("SAL") beta zeolite was prepared in accordance with the procedure set forth in Example 5 of U.S. Pat. No. 6,171,556. The SAL beta zeolite was then steamed in an atmosphere of air with 60% of steam at 650° C. for 24 hours to give a final product having a $SiO_2/Al_2O_3$ ratio of about 200.

500 g of the steamed-SAL final product were dispersed in 521 g of deionized water to form a slurry having a 48% solid content. The slurry was then ball milled such that 90% of the particles had a particle size of less than 9.5 microns. A final slurry was achieved by adding the slurry with 21 g of a colloidal polyacrylic dispersant and 154 g of a polyacrylic latex binder having a solids content of about 50wt. %, a pH of about 6 and a maximum viscosity of 400 cps.

EXAMPLE 2

A unit comprising a Cr—Al—Fe alloy tube of 3" diameter and 3" length was fitted with a Fe—Cr alloy fluted band of 2" height, with the flutes extending about ⅛" from the inner wall of the tube (the band was recessed about ½" from each end of the tube). This band was coated with the final slurry obtained from Example 1. The coated band was dried and placed in a programmable oven and the temperature was slowly raised to 105° C. and maintained at such temperature for 1 hour. The washcoat dry gain was 6.4 g. The band was again coated by the same procedure resulting in a coated band having a final dry gain of 12.1 g.

EXAMPLE 3

Example 2 was repeated with a Cr—Al—Fe alloy tube of 3" diameter and 3" length which was fitted with a Fe—Cr alloy fluted ribbon of 2" height, with the flutes having peak heights of about 5/32" arranged in a serpentine manner; the ribbon was recessed ½" from each end of the tube. This ribbon was coated with the final slurry prepared in Example 1. The coated ribbon was dried and placed in a programmable oven and the temperature was slowly raised to 105° C. and maintained at such temperature for 1 hour. The washcoat dry gain was 8.5 g. The ribbon was again coated by the same procedure resulting in a coated ribbon having a final dry gain of 19.5 g.

EXAMPLE 4

The units of Example 2 and Example 3 were tested for effectiveness in trapping hydrocarbons. The test vehicle was a 2000 model year vehicle having four cylinders and an engine displacement of 2.3 liters. The total mass of emitted hydrocarbons was measured over a 2-day test period under identical conditions. The baseline, i.e., with no housing present in the air induction system of the vehicle, was measured as 10.1 mg/day of hydrocarbons on day 1 and 16.4 mg/day of hydrocarbons on day 2. The unit of Example 2 was installed in the conduit downstream of the air cleaner and upstream of the intake manifold and the cumulative mass of hydrocarbons was measured as 2.1 mg/day on day 1 and 4.1 mg/day on day 2. The test was repeated using the unit of Example 3 (instead of the unit of Example 2) installed in the conduit downstream of the air cleaner and upstream of the intake manifold and the cumulative mass of hydrocarbons was measured as 1.12 mg/day on day 1 and 0.59 mg/day on day 2. These results clearly show that the volatile hydrocarbon adsorbent unit of the invention is effective in reducing the emissions of hydrocarbons through the air induction system of the engine to the extent that much less than 10 mg/day of such hydrocarbons are emitted, thereby helping to meet the LEV II Evaporative Hydrocarbon regulation limit which will be imposed by the Federal Government in respect to the 2004 model year automobiles.

EXAMPLE 5

500 g of gamma-alumina having a surface area of 150 m$^2$/g were dispersed in 521 g of deionized water to form a slurry having a 48% solids content. 60 g of acetic acid were added to the slurry which was thereafter ball milled such that 90% of the particles had a particle size of less than 9 microns. A final slurry was then achieved by adding 55 g of an alumina binder. The final slurry was further ball milled such that 90% of the particles had a particle size of less than 7 microns. The pH of the resultant slurry was then adjusted with acetic acid to a pH of about 4 and a viscosity of 80 cps. The fluted aluminum band of the type described in Example 2 was then coated with the slurry for a target dry gain of 0.32 g. The coated fluted band was dried in an oven for 1 hour at 105° C. and then calcined at 550° C. for 1 hour.

The coated fluted band was thereafter further coated with the slurry of the beta zeolite as set forth in Example 2. The resultant coated fluted band was coated with an alumina slurry overcoat for a target dry gain of 0.8 g. The coated fluted band was then again dried at 105° C.

EXAMPLE 6

400 g of the beta zeolite employed in Example 1 was mixed with 100 g of an activated carbon having a pore size distribution ranging from 10 to 250 angstroms. A slurry of the mixed powder was then prepared as described in Example 1 in respect to the zeolite slurry. The mixed powder slurry was then coated onto a fluted band that had previously been coated with alumina as described in Example 5.

EXAMPLE 7

A slurry of the activated carbon employed in Example 6 was prepared in the same manner as described in Example 1 in respect to the zeolite slurry. The activated carbon slurry was then coated onto a fluted band that had been previously coated with alumina and a beta zeolite in the manner described in Example 5.

EXAMPLE 8

A slurry of unsteamed SAL beta zeolite was prepared in the manner set forth in EXAMPLE 1. This slurry was then coated onto a ribbon in the same manner as set forth in Example 3. The adsorber unit was then evaluated for n-butane trapping capacity in a laboratory bench unit.

The laboratory bench unit contained a stream of n-butane flowing at the rate of 25 cc/min, and another stream of nitrogen flowing at the rate of 25 cc/min. The two gas streams were combined and then flowed into a test chamber with the adsorbent unit as prepared above mounted within the chamber. The gas stream exiting the test chamber was further diluted with 10 liters/min of nitrogen. A split stream of two liters/min was sampled through a sampling pump and sent to a flame ionization detector unit in order to monitor the breakthrough of n-butane. The test was allowed to continue until the inlet concentration of n-butane equaled the outlet concentration, at which point the adsorbent unit was fully saturated.

The test chamber was disconnected from the test bench and weighed. The amount of adsorbed n-butane was obtained by subtracting the initial weight of the test chamber. The weight was found to be 1.47 grams.

EXAMPLE 9

Example 8 was repeated using an adsorbent unit prepared with steamed SAL beta zeolite. The amount of n-butane trapped in the unit was 1.02 grams.

What is claimed is:

1. A system for controlling the emission of volatile hydrocarbons from an automobile engine having an intake manifold, the system including an air cleaner upstream of the engine intake manifold comprising a volatile hydrocarbon adsorber unit including a housing having an air inlet and an air outlet, said housing containing a substrate and a volatile hydrocarbon adsorber material coated on the surface of the substrate, said volatile hydrocarbon adsorber material comprising a natural zeolite, a synthetic zeolite or a mixture of a natural and a synthetic zeolite, said material further containing a binder that will cause the material to adhere to the surface of the substrate, the adsorber unit located in a conduit downstream from the air cleaner and upstream of the intake manifold, the adsorber unit being operative to control the emission of volatile hydrocarbons when the engine is shut off.

2. The system of claim 1 wherein the housing is comprised of a metal or a polymer.

3. The system of claim 2 wherein the housing is comprised of a metal selected from the group consisting of aluminum, a Fe——Cr alloy and a Fe——Cr——Al alloy.

4. The system of claim 1 wherein the material is selected from the group consisting of a molecular sieve, silica gel, activated carbon and mixtures thereof.

5. The system of claim 1 wherein the material comprises separate layers of a zeolite, silica gel and activated carbon.

6. The system of claim 1 wherein the natural or synthetic zeolite is selected from the group consisting of faujasite, chabazite, clinoptilolite, mordenite, silicalite, zeolite X, zeolite Y, ultrastable Y, ZSM zeolite, offretite and a beta zeolite.

7. The system of claim 6 wherein the beta zeolite has a silica:alumina molar ratio of about 25:1 to about 1000:1.

8. The system of claim 6 wherein the beta zeolite comprises acid-leached beta zeolite.

9. The system of claim 6 wherein the beta zeolite steam-treated beta zeolite.

10. The system of claim 1 wherein the substrate comprises a polymer or a metal and is present in a corrugated mode.

11. The system of claim 10 wherein the metal is selected from the group consisting of aluminum, titanium, stainless steel, Fe——Cr alloy and Fe——Cr——Al alloy.

12. The system of claim 1 wherein the material is deposited on a high surface refractory metal oxide that in turn is deposited on the surface of the substrate.

13. The system of claim 12 wherein the metal oxide comprises gamma alumina.

14. The system of claim 1 wherein the binder is selected from the group consisting of organic polymers; sols of alumina, silica or zirconia inorganic salts, organic salts and/or hydrolysis products of aluminum, silica or zirconium; hydroxides of aluminum, silica or zirconium; organic silicates that are hydrolyzable to silica; and mixtures thereof.

15. The system of claim 14 wherein the polymer is selected from the group consisting of acrylic polymers, vinyl acrylic polymers; styrene acrylic polymers; vinyl acetate polymers, ethylene vinyl acetate polymers; styrene butadiene rubber; vinyl alcohol polymers; polyurethanes; silicones and mixtures.

16. The system of claim 15 wherein the binder comprises an acrylic/styrene acrylic copolymer latex.

17. The system of claim 1 wherein the material further contains an anionic, non-ionic or a cationic dispersant.

18. The system of claim 17 wherein the dispersant is selected from the group consisting of polyacrylates, alkoxylates, carboxylates, phosphate esters, sulfonates, taurates, sulfosuccinates, stearates, laureates, amines, amides, imidazolines and mixtures thereof.

19. The system of claim 18 wherein the dispersant comprises a low molecular weight polyacrylic acid that has many of its protons replaced with sodium.

* * * * *